United States Patent [19]
Suggs

[11] Patent Number: 5,331,736
[45] Date of Patent: * Jul. 26, 1994

[54] METHOD OF LOADING A LIVELOAD ASSEMBLY FOR ROTARY OR RECIPROCATING SHAFT PACKING

[76] Inventor: Steven M. Suggs, 6585 Wright Rd., Atlanta, Ga. 30328

[*] Notice: The portion of the term of this patent subsequent to Mar. 24, 2009 has been disclaimed.

[21] Appl. No.: 776,844

[22] Filed: Oct. 15, 1991

Related U.S. Application Data

[60] Continuation of Ser. No. 644,966, Jan. 22, 1991, Pat. No. 5,097,595, which is a division of Ser. No. 287,079, Dec. 20, 1988, Pat. No. 5,024,453.

[51] Int. Cl.⁵ .............................................. B21D 53/00
[52] U.S. Cl. .................. 29/890.124; 29/451
[58] Field of Search ............... 29/888.3, 451, 450, 29/452, 124; 277/106, 186; 267/162

[56] References Cited

U.S. PATENT DOCUMENTS

| | | | |
|---|---|---|---|
| 2,042,691 | 6/1936 | Williams | 29/888.3 |
| 3,873,079 | 3/1975 | Kuus | 267/162 |
| 4,106,170 | 8/1978 | Schoeneweis | 29/151.1 |
| 4,296,538 | 10/1981 | Straslicka | 29/888.3 |
| 4,571,133 | 2/1986 | Lindow | |
| 4,607,421 | 8/1986 | Zemek et al. | |
| 4,651,981 | 3/1987 | Passiniemi | |

OTHER PUBLICATIONS

Electrical Power Research Institute, Foster—Miller, Inc., Waltham, Mass., "Valve Stem Packing Improvements", EPRI NP-4255, Project 2233-3, Interim Report, Feb. 1986.

*Primary Examiner*—Irene Cuda
*Attorney, Agent, or Firm*—Kennedy & Kennedy

[57] ABSTRACT

A liveload assembly including an stack guide, compressed belleville washers stacked inside the stack guide and a retainer to hold the compressed washers in the stack guide. A longitudinal slot in the wall of the stack guide permits visual checking of the compression provided by the liveload assembly on the gland follower of the valve or pump. The rotary or reciprocating shaft of a valve or pump is liveloaded by placing the liveload assembly over the bolt securing the gland follower to the stuffing box. A nut is threaded on the bolt until it contacts the washers and the retainer removed. The liveload assembly is preloaded by pushing on the stack of belleville washers with a bar driven by a hydraulic cylinder. The retainer is positioned against the stack to hold the belleville washers in compression.

5 Claims, 2 Drawing Sheets

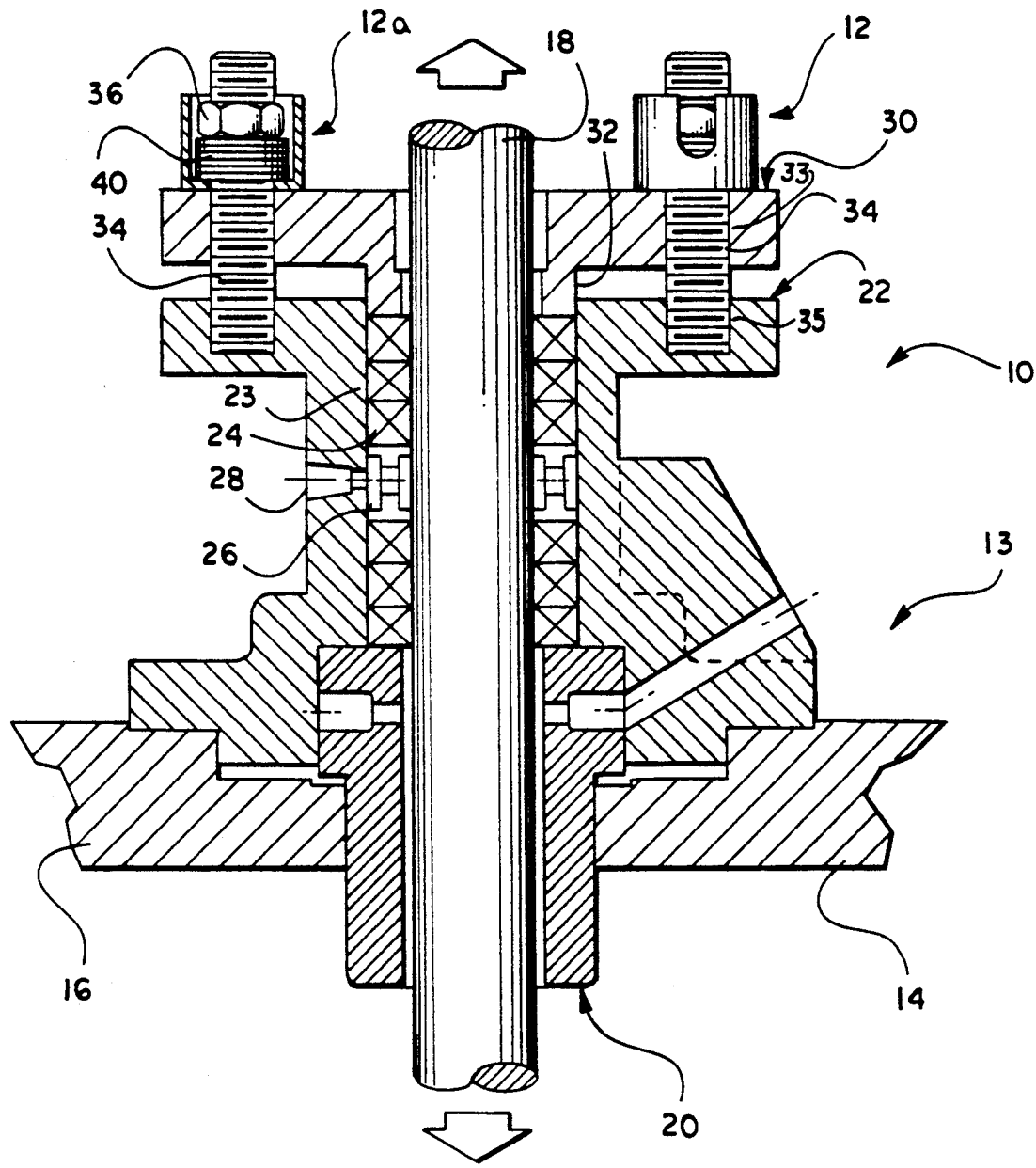
Fig_1

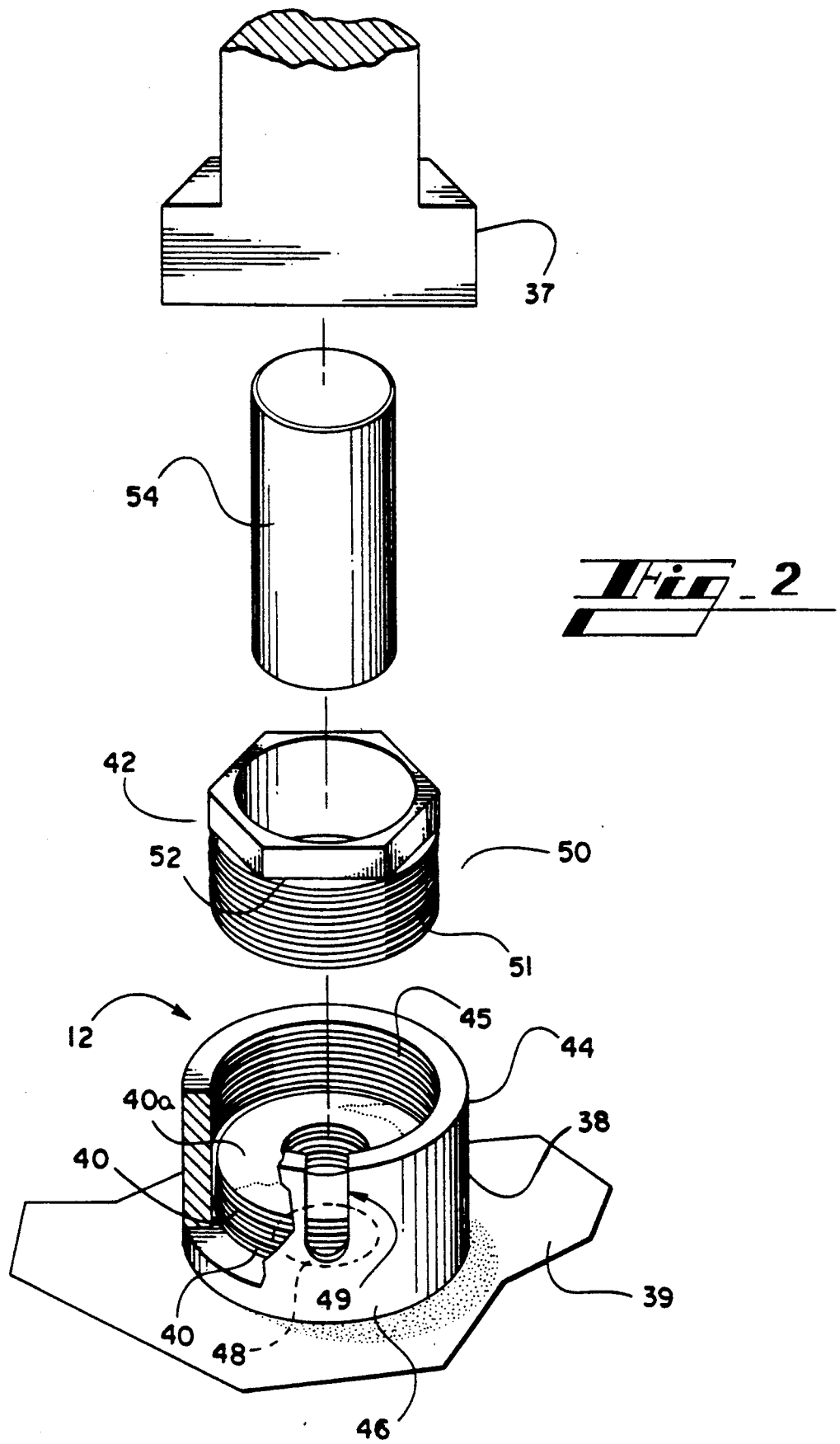

METHOD OF LOADING A LIVELOAD ASSEMBLY FOR ROTARY OR RECIPROCATING SHAFT PACKING

This is a continuation of co-pending application Ser. No. 644,966 filed Jan. 22, 1991 U.S. Pat. No. 5,097,595, which is a division of pending application Ser. No. 287,079 filed Dec. 20, 1988 issued as U.S. Pat. No. 5,024,453 on Jun. 18, 1991.

TECHNICAL FIELD

The present invention relates to the prevention of stuffing box packing leakage. More particularly, the present invention relates to a liveloading assembly that maintains a proper gland bolt load on the stuffing box of a pump, valve or like fluid-flow apparatus, to a method of manufacturing the liveloading assembly, and to a method of installing the liveloading assembly.

BACKGROUND OF THE INVENTION

Fluid flow equipment including pipes, valves, and pumps are common in the utility, refinery, manufacturing, chemical and petrochemical industries. The mechanical workings of such valves and pumps are housed in casings through which rotary or reciprocating shafts extend. For example, the shaft of a rotary pump operatively connects a motor on the exterior of the casing to an impellor on the interior of the casing. The shafts rotate or reciprocate in response to a number of specific stimuli, including a knob turned by hand, a motor, or an impeller driven by fluid flowing in the equipment.

Thus, there are at least three openings in a pump or valve casing: (1) an opening for an inlet pipe by which fluid is delivered; (2) an opening for an outlet pipe by which fluid is discharged; and (3) an opening for the shaft. Various types of seals prevent leakage of fluid from the pump or valve casing. The two fluid openings for the inlet and the outlet pipes are sealed conventionally. The shaft projects through the casing in an area known as the "stuffing box" or the "packing box." The terms "stuffing box" and "packing box" are interchangeable, and derive from the method of preventing fluid leakage by stuffing or packing a material around the shaft to provide the seal. The packing material is often composed of woven or braided fibers formed into coils, spirals or rings. The packing material is stuffed around the shaft so that no fluid can escape the casing along the shaft. A lubricant is often impregnated in the packing material to facilitate installation and to reduce friction on the packing material.

Rotary and reciprocating shaft-equipped pumps, valves, compressors, agitators and the like, interact with a variety of fluids. Such fluids may be as harmless as cool water or as dangerous as a radioactive, superheated acid. Preventing leakage of any fluid from the opening for the shaft is important. The cost of any such leakage can range from the loss of fluid and operating time for repair of the leak, to significant environmental damage and loss of life.

For example, consider a pump in a nuclear fueled steam generating plant. In nuclear reactors, pumps are used to circulate a coolant (oftentimes water) across nuclear fuel elements. The coolant and nuclear fuel are placed together in a pressure vessel. Piping from the pressure vessel delivers the coolant, heated by contact with the nuclear fuel, to a heat exchanger. The heat exchanger extracts the heat from the coolant. The piping thus forms a continuous loop between the pressure vessel and the heat exchanger so that the coolant is continuously recycled. As a result, radioactivity is safely contained within this closed system. Pumps are often provided between the pressure vessel and the heat exchanger to deliver the coolant. Any leakage from the pump destroys the closed system and permits radioactive coolant to escape. Failure of a seal in this example will not only result in the discharge of a toxic material into the environment, but could cause an explosion or fire.

In addition to actual damage caused by leaks, profits and the health and welfare of employees are affected. Many industrial processes require large amounts of time to regain normal operation. Frequent shutdowns of the process greatly affect production capability. Thus, having to shut down a plant for any period of time in order to replace worn or damage packing in the stuffing box reduces operating time and, correspondingly, reduces profit. Moreover, workers are often at risk in replacing such worn packing. For example, the packing in a pump and valve becomes saturated with the fluid being sealed. The packing in a pump used to circulate coolant in a nuclear reactor will be exposed to radioactivity from the coolant. A worker who removes old and worn packing from such a pump is, for a time, exposed to the radiation contained in the fluid and saturated in the packing. Accordingly, frequent replacement of the packing material in the stuffing box is not desirable. Moreover, it is preferred that all steps be taken to minimize the risk of such radiation exposure.

Rotating and reciprocating shafts are difficult to seal. In operation, such shafts are capable of both radial and axial displacement. Radial displacement typically results from manufacturing inaccuracies. Axial displacement results from different thermal expansions produced through normal operation of the shaft. Furthermore, the stuffing box environment is less than ideal. Conditions are constantly changing. The packing may be required to withstand high temperatures and pressures one minute and low temperatures and pressures the next. Shaft speeds may also vary. The surfaces of the shaft in the stuffing box are often pitted and rough. Very slight defects in the arrangement or condition of a stuffing box can prevent proper pump operation.

Various types of packing for a stuffing box are known in the prior art. Each of these packings attempts to be responsive to the foregoing considerations. The packing must be somewhat plastic so that it can extrude enough to seal rough or uneven surfaces. The packing must be resilient in order to adapt to changing conditions without failing or damaging the shaft. However, in trying to provide flexibility, some packings sacrifice resiliency. Others, in trying to resist extrusion, sacrifice flexibility sufficient to conform to uneven or rough surfaces within the stuffing box. Still other packings are flexible, resilient and minimize friction, but do not provide a long-lasting seal so as to avoid frequent replacement.

Soft packing is a common shaft seal, and is generally made from asbestos, fabric, hemp or rubber fibers woven into strands and formed into a braided spiral. Soft packing is inexpensive and offers several desirable features. The softness of the packing allows it to absorb energy without damaging the rotating shaft. Soft packing is also very flexible and readily conforms to the area to be sealed.

Soft packing, however, has several disadvantages. One problem is short life. Soft packing is easily worn by friction and easily damaged, therefore requiring frequent replacement. Soft packing may be impregnated with graphite or lubricating oils to reduce friction between the shaft and the packing, but such lubricants quickly dissipate and are not very effective in overcoming the short life problem. Thus, soft packings are best suited for low shaft speed applications involving non-caustic and non-abrasive fluids. Yet another problem with soft packing is a lack of resiliency. After being compressed and extruded, soft packings are unable to re-expand to effectuate a seal. Resiliency, conventionally defined as the ability of packing to re-expand, is important to enable the packing material to adjust to changing conditions. Lack of such resiliency, as in the case of a soft packing, results in frequent adjustment or replacement for the packing.

U.S. Pat. No. 3,404,061 teaches a sealing material made from expanded graphite. One common use of such material is to wind a length of flexible tape made therefrom onto a mandrel to form a solid annulus of appropriate size to pack the stuffing box. Thus, the expanded graphite tape is formed as a seal. Packing made from expanded graphite is flexible and conforms to uneven surfaces. The graphite material makes the packing self-lubricating, thereby minimizing friction between the shaft and the packing. With such self-lubricating packings, the lubricant does not dissipate with time. Expanded graphite packing also absorbs energy without excessive damage to either the packing or the shaft.

The principal problem with expanded graphite packings is a lack of resiliency and excessive extrusion under high temperatures and pressures. Solid graphite packings are not able to withstand high pressures since they lack the internal strength to resist extrusion and are unable to re-expand after compression. In addition, expanded graphite packings require frequent adjustment under normal conditions due to the low resiliency of the graphite. The graphite packings are easily compressed, thereby contributing to the low resiliency problem. As a result, normal rotation or reciprocation of the shaft can compress the graphite and create leaks.

A further problem with soft packings (and expanded graphite packing in particular) is that they are difficult to extract from the stuffing box when replacement is necessary. Soft packing can extrude to such an extent that it melds to the walls of the stuffing box, making removal difficult. Those skilled in the art will appreciate that the typical stuffing box provides an annular recess about the shaft, into which the packing is stuffed. The recess is capped by a gland follower. The gland follower is secured to the casing, known as the gland of the stuffing box, by one or more bolts. Thus, the more torque applied to the gland bolts, the greater the downward pressure applied to the packing by the gland follower. Tightening the gland bolts compresses the packing in the stuffing box to effect the seal.

Generally speaking, there are three conditions that result in leakage: packing consolidation; bolt creep; and improper loading.

Packing consolidation occurs naturally, and refers to the packing's tendency to settle, wear, and loosen over time. A number of factors contribute to this condition, including the constant rotation of the shaft, changes in temperature of fluids flowing through the equipment, and the age and material of the packing itself. Soft packing is particularly susceptible to consolidation.

Bolt creep is a condition wherein the gland bolts are moved upward due to the expansion and contraction of the gland follower and the casing. Such expansion and contraction often results from a change in operating temperatures and pressures. Valves and pumps in various industries often operate under conditions ranging from cyrogenic to superheated temperatures, and normal to extreme pressures and vacuums. Bolt creep reduces the pressure applied by the gland follower on the packing.

Improper loading is a condition wherein the compression exerted by the gland follower on the packing is insufficient to effect a seal. Packing consolidation and bolt creep are contributing elements of improper loading, because both reduce the compressive force applied by the gland follower on the packing. But inaccurate torquing of the gland bolts by workers also causes improper loading. Such inaccurate torquing may be the result of human errors. However, it is recognized that the torque wrenches used by workers are often inaccurate, resulting in improper loading. Leaks thus occur from the outset because the load on the packing is insufficient to achieve or maintain a seal.

Fluid leakage along the shaft of valves and pumps has long been recognized as a serious problem in power and industrial plants. In recognition of this problem, various attempts have been made to obtain leak-free performance and reduce maintenance requirements for a pump or a valve. For example, improved packing materials were developed for a larger range of temperatures, better chemical resistance, and improved coefficient of expansion characteristics. Torque values were established for the bolts connecting the gland follower to the stuffing box. (Installers follow such specifications to apply a proper load to the packing to achieve a seal, but as discussed above, may not attain a proper load because the torque wrenches are inaccurate.) Several companies have initiated routine maintenance programs that include re-torquing of gland follower bolts. Such retorquing is done frequently because of the significant risk posed by improperly loaded gland bolts and the resulting leakage of fluid from the apparatus. The costs of repairing damaged equipment and cleaning up spent fluids are also of concern. But generally, the majority of the equipment does not need such maintenance. Such maintenance programs include all equipment, however, in order to correct the torque on the relatively few pieces of equipment for which packing compression is lessened (as a result of bolt creep, packing consolidation or previous improper loading) to an extent that leaking has occurred or could occur.

Another attempt to obtain leak-free performance and reduce maintenance requirements involves liveloading of the gland follower. Liveloading refers to the mounting of compressed springs on the gland follower whereby a constant pressure is exerted on the gland follower to insure a constant compressive force is exerted on the packing. As the packing consolidates or the gland bolts loosen, the spring pressure moves the gland follower towards the stuffing box to maintain the integrity of the packing.

Belleville washers are one type of spring typically used to cushion heavy loads with short motion. Uncompressed belleville springs or washers typically take the form of a disk with an open center. In contrast, compressed belleville washers are flat. A significant amount of force is required to compress or flatten the uncompressed belleville washers. Belleville washers installed on the gland bolts of pump and valve stuffing boxes maintain the force exerted by the gland follower on the packing. As the packing consolidates or the gland bolts loosen, the belleville washers decompress and maintain the load on the packing. The gland follower essentially becomes self adjusting in response to the packing's condition to maintain a proper load on the packing and thereby maintain a seal.

Liveloading a gland follower is difficult in many situations. It is particularly difficult to retrofit valves for liveloading for a number of reasons. Replacement of bolt studs may be necessary because the studs are not long enough to accommodate a sufficient number of uncompressed belleville washers and the nut that conventionally maintains the gland follower. Those skilled in the art will appreciate that uncompressed belleville washers occupy more space than compressed washers. Accordingly, the gland bolts must often be extruded and replaced with longer bolts. This is particularly expensive in nuclear power plants, not only because expensive high grade steel material must be used to manufacture the extended bolts, but also because a significant amount of paperwork detailing the change must be prepared and filed with the various regulatory agencies and manufacturers involved with the equipment and nuclear power plants. Also, health and safety inspectors at nuclear plants track carefully the amount of radiation to which workers are exposed because there is a limit to the amount of radiation a worker may receive. Additional workers thus may be needed for simple, yet time-consuming projects.

Another reason that liveloading is difficult is because achieving the right load on the belleville washers is expensive and difficult. The retaining nut must be torqued on the bolt to a specific degree to achieve and maintain a seal. Proper torquing of the washers, even using torque wrenches, takes a long time. In a nuclear plant, any additional maintenance time increases the worker's exposure to radiation from the fluid. Torque wrenches are recognized as inherently inaccurate. Engineers at nuclear plants in particular are uncomfortable relying on such tools to achieve a proper torque.

Yet another reason that liveloading is difficult is because belleville washers are difficult to install about a gland bolt. Aside from being a time consuming operation, the component washers are small in size and difficult to manipulate. Workers in heavily radiated areas must wear several sets of gloves and a respirator. Gloves make such small objects difficult to handle and position over a bolt. The respirator makes it difficult to see. If a single belleville washer is dropped and lost, work may be delayed for hours.

A further reason that liveloading is difficult is that belleville washers, once placed on a gland bolt and even when properly torqued, may slip laterally and hang or catch on the bolt. This causes hysteresis, a retardation of the self-adjusting effect of the belleville washers on the gland follower.

Thus, there exists a need in the art for an apparatus for liveloading, and for a method of preparing an apparatus for liveloading, the gland follower that is free of the problems typically experienced when liveloading valves, pumps and the like in power and industrial plants.

SUMMARY OF THE INVENTION

The present invention provides a liveload assembly of belleville washers precompressed to a predetermined load for installation on a gland bolt. The liveloading assembly of the present invention includes a stack guide and a plurality of belleville washers stacked inside the stack guide. A retainer holds the compressed washers in the stack guide.

The preferred stack guide is a cylinder with an open top end and a bottom end with an aperture coaxial with the longitudinal axis of the cylinder. The aperture is sized to permit the stack guide to pass over the gland bolt of the equipment on which the liveloading assembly is to be installed. The inner wall of the stack guide is threaded from the top end towards the bottom end. A slot in the wall of the stack guide extends downwardly from the top end towards the bottom end. The slot permits visual checking of the compressed washers to provide an indicator showing the extent to which the washers have decompressed.

The stack guide receives the plurality of belleville washers, each washer formed with a center opening of suitable dimension to pass over the gland bolt.

The preferred retainer is an open ended cylinder having a threaded exterior surface and a hex head machined in one end of the cylinder. The retainer is sized so as to be threadably received by the stack guide, thereby holding the belleville springs within the stack guide. The retainer defines a center opening of sufficient diameter to permit a gland bolt nut to pass therethrough.

The liveload assembly of the present invention is preferably assembled by stacking uncompressed belleville washers inside the stack guide. The belleville washers are then compressed. The washers are held compressed in the stack guide by threading the retainer into the stack guide.

The liveload assembly is preferably installed by sliding the assembly over a gland bolt threaded into the gland follower. A nut is threaded onto the bolt until it contacts the compressed belleville washers in the assembly. The retainer is then removed from the stack guide by gripping the hex head with a wrench and turning the retainer. The gland follower, and hence, the packing in the stuffing box, is liveloaded by the compressed washers. As the gland follower travels over time towards the casing, the stack guide moves with respect to the gland bolt. When the stack guide reaches a predetermined position with respect to the gland nut, as revealed by the slot, the nut is to be retorqued to recompress the belleville washers and thereby maintain a proper force on the gland follower and, in turn, on the packing in the stuffing box.

Accordingly, it is an object of the present invention to provide a liveloading assembly with compressed belleville washers preloaded in an assembly for installation on a gland bolt.

It is an object of the present invention to provide a liveloading assembly permitting a gland follower to be preset to a predetermined torque.

It is an object of the present invention to provide a liveloading assembly that reduces the time for installing belleville washers on a gland bolt.

It is an object of the present invention to provide a liveloading assembly that simplifies the installation and torquing of belleville washers on gland bolts to liveload the gland follower.

It is an object of the present invention to provide a liveloading assembly that reduces worker exposure to radiation when installing liveload belleville washers on valves in a nuclear plant.

It is an object of the present invention to provide a liveloading assembly that permits retrofit liveloading of valves or pumps without having to replace the gland bolts with longer bolts.

It is an object of the present invention to provide a liveloading assembly that reduces reliance on inaccurate torque wrenches used to liveload the stuffing box of a rotary or reciprocating shaft by providing belleville washers in an assembly preloaded to a calibrated compression.

It is an object of the present invention to provide a liveloading assembly that provides a liveload belleville washer assembly for a gland follower which compresses the packing in a stuffing box seal of a shaft.

It is an object of the present invention to provide a liveloading assembly that provides an indicator flagging a rotary or reciprocating shaft having liveload belleville washers which need to be retorqued.

It is an object of the present invention to provide a liveloading assembly that reduces the costs of routine valve and pump maintenance for re-torquing gland follower bolts by mechanically flagging a bolt which needs to be retorqued.

Still other objects, features and advantages will become apparent upon a reading of the following detailed description in conjunction with the drawings and the appended claims.

BRIEF DESCRIPTION OF THE DRAWINGS

FIG. 1 is a cross-section view of a preferred embodiment of a liveloading assembly of the present invention, showing the device as attached to the gland follower and the stuffing box.

FIG. 2 is a perspective exploded partially cut-away view of the embodiment shown in FIG. 1 positioned in a hydraulic press for compressing of the belleville washers in the assembly.

DETAILED DESCRIPTION OF THE PREFERRED EMBODIMENTS

Referring now in more detail to the drawings, in which like numerals indicate like parts throughout the several views, FIG. 2 illustrates an exploded perspective cut-away view of the liveload assembly 12 including an stack guide 38, a plurality of belleville washers 40, and a retainer 42.

The top end 44 of the cylindrical stack guide 38 is open while the bottom 46 defines an aperture 48. The aperture is coaxial with the longitudinal axis of the stack guide 38. The interior of the stack guide 38 is threaded with a thread 45 from the top 44 a predetermined distance towards the bottom 46. A slot 49 in the wall of the stack guide 38 extends longitudinally from the top end 44 a predetermined distance towards the bottom end 46. Preferably, the slot 49 extends to the longitudinal point which the uppermost belleville washer 40a will occupy when the assembly is loaded. The belleville washers 40 are ring-like dished disks which flatten when compressed.

The retainer 42 is preferably a cylindrical open ended tube with the hex head 52 machined in one end. An exterior portion 50 includes a thread 51 to mate with the interior thread 45 of the stack guide 38.

FIG. 2 further illustrates a piston 37 and a support 39 in a hydraulic press (not illustrated) which cooperate with a cylindrical rod or tube 54 to load the liveload assembly 12. As will be described in more detail, loading is accomplished by compressing the belleville washers 40 and securing the washers 40 with the retainer 42. A compressed liveload assembly 12 may then be installed on the gland follower of a pump or valve casing. For instance, in FIG. 1, there is shown in a cross-sectional view a casing 10 including an embodiment of the precompressed liveload assembly 12 which maintains compressive force on the packing in the stuffing box. The casing 10 is representative of a casing for either a pump or valve. Both may use a stuffing box seal to reduce or eliminate leaks through the valve or the pump. For discussion purposes, the casing 10 will be considered part of a pump 13. The pump 13 includes a discharge side 14 and an inlet side 16. A rotatable shaft 18 connects to an impellor (not shown) at one end and to a motor (not shown) at the other end. A bushing 20 supports the rotatable shaft 18 in the pump 13.

The casing 10 of the pump 13 defines a gland stuffing box 22. The stuffing box 22 defines an annular region 23 through which the shaft 18 extends. Compression packing 24 is held in the annular region 23 of the stuffing box 22 to seal the casing 10 and prevent fluid leakage along the shaft 18. The illustrated embodiment includes a lantern ring 26 which communicates with an aperture 28 for the introduction of lubricants to the packing 24.

A gland follower 30 includes an annular flange 32 which inserts in the annular region 23 of the stuffing box 22. The gland follower includes bores 33. A bolt 34 connects to the stuffing box 22 by threadably engaging a bore 35. The bolt passes through one of the bores 33. A nut 36 on each bolt 34 retains the liveload assembly 12 (and 12a shown in cut-away view) securely to the top of the gland follower 30. The compressed belleville washers 40 push against the nut 34 and the gland follower 30 to maintain the compressed load on the packing 24 in the stuffing box 22.

The stack guide 38 accordingly defines a cup in which the belleville washers 40 fit. In a preferred embodiment, the outside diameters of the belleville washers 40 have about 0.0025 inch clearance overall to fit in the interior of the stack guide 38. The aperture 48 in the bottom 46 of the guide 38 is drilled to fit over a gland bolt 34, also preferably with about a 0.0025 inch clearance.

In a preferred method of loading the liveload assembly 12 of the present invention, the stack guide 38 as shown in FIG. 2 is placed on a support 39. The appropriate number and size of belleville washers 40 are placed inside the stack guide 38. The retainer 42 is threaded into the open end 44 of the stack guide 38. A tube or bar 54 is inserted coaxially through the retainer 42 to contact the top belleville washer 40 in the stack guide 38. The hydraulic press is activated and the piston 37 moved downward. The piston 37 pushes on the tube 54 compressing the belleville washers 40. A gauge (not illustrated) connected to the hydraulic press provides an indicator permitting compression of the belleville washers to a specific loading. An ordinary wrench is placed on the hex head 52 of the retainer 42 and the retainer 42 is turned into the stack guide 38 until the bottom of the retainer 42 contacts the top belleville washer 40a. The hydraulic press is released withdrawing the piston 37, and the tube 54 is removed from the assembly 12. The preloaded assembly 12 is ready for storage, shipping and installation on a valve or a pump.

In an alternate assembly method, the stack guide 38 and the retainer 42 are threaded after determining the compressed, loaded position of the washers in the stack guide 38. The stack guide first is placed over a bolt or stud on a support (not illustrated). The appropriate number and size of belleville washers 40 are placed inside the stack guide 38. The belleville washers 40 are then loaded by compressing with a hydraulic press or using torque wrenches. When the proper load is achieved, a precise measurement of the washer stack height is taken and the washers are unloaded and removed from the stack guide 38.

The inside surface of the stack guide 38 is then threaded from the top 44 towards the bottom 46. In a preferred embodiment, the thread 45 is cut to about one turn above the previously marked belleville washer compression height. The bottom portion 50 of the retainer 42 is then cut with the mating thread 51.

The stack guide 38 is re-positioned on the bolt (not illustrated). The belleville washers 40 are placed back on the bolt 34 inside the stack guide 38 and reloaded with a nut (not illustrated). Turned with a torque wrench, the nut compresses the belleville washers 40. The nut is torqued to the marked height representing the predetermined compression load for the washers 40. The retainer 42 is threaded and screwed down into the stack guide 38 until the thread stops. This is about one turn above the washer compression height. The nut is loosened and the washers 40 uncompress the distance between the mark and the bottom of the retainer 42. The liveload assembly with the washers in the preloaded position is ready for storage, shipping and installation on a valve or pump. The liveload assembly 12 from this alternative method has compressed washers 40 preloaded to a position approximately within 0.002 inch of the intended load position because installing the retainer 42 permits the washers 40 to decompress about one thread turn.

With reference to FIG. 1, the gland follower 30 may be liveloaded by first installing the packing 24 in the annular region 23 of the stuffing box 22. The bolts 34 thread into the bores 35 of the stuffing box 22. The gland follower 30 is positioned with the annular flange 32 in the open top of the annular region 30 of the stuffing box 22. The bores 33 align with the bolts 34 as the gland follower is positioned over the stuffing box. One liveload assembly 12 is positioned over each bolt 34. The gland nut 36 is tightened by hand until it reaches the top of the washers 40. A standard wrench is then used to tighten the gland nut 36 one turn. This compresses the belleville washers 40 to the intended loading height. It also relieves the pressure from the belleville washers 40 on the bottom of the retainer 42. The retainer 42 is then removed.

As the packing 24 consolidates and compresses, the gland follower 30 is pushed axially by the liveload assemblies 12 and 12a towards the stuffing box 22 to maintain compression on the packing 24. When the gland follower 30 moves, the compression on the belleville washers 40 lessens. Movement of the gland follower 30 causes the stack 38 to move axially with respect to the bolt 34. The slot 49 in the stack guide 38 permits visual monitoring of the load provided by the liveload assembly 12. A preferred embodiment uses belleville springs with linear regressive load deflection. Such belleville springs provide a direct correlation between the compression lost by changes in the packing 24 and the movement of the stack guide 38 relative to the gland nut 36 threaded onto the bolt 34. Other types of belleville washers will work with the stack guide 38 and retainer 42 of the present invention, but to equate deflection to compression requires reference to a formula or the manufacturer's spring table specifications.

It is advantageous to paint the edge of the top belleville washer 40a with a florescent paint prior to loading the washer in the stack guide 38. A mark also made with florescent paint may be applied to the stack guide 38 between the top and bottom of the slot 49. When the top belleville washer 40a reaches the stack mark, then the liveload assembly should be retorqued to specifications. Use of florescent paint permits visual checking of the load condition by flashlight. The mark on the stack guide 38 is made at a point where 60 percent of the compressive force is lost. Depending on particular requirements and specifications, the mark may be positioned to reflect any desired portion of capacity used. Marking the stack guide 38 at 60 percent compression loss provides a margin of error in the event the need for retorquing is not timely detected.

The liveload assembly 12 is particularly suited for installation on valves and pumps used in nuclear plants. The assembly readily fits on existing bolts securing the gland follower to the stuffing box. Generally, the gland bolt does not have to be replaced with a longer bolt as may be the case when uncompressed belleville washers are positioned over the bolt.

Further, the liveload assembly 12 of the present invention may be installed more quickly on valves and pumps than previous methods of installing belleville washers. Installation and compression of belleville washers on a valve or pump may take as much as one hour or more to position the belleville washers and to compress them to the proper specified load using torque wrenches. Installation of the liveload assembly 12 according to the present invention however is direct, rapid and trouble free. Significant time and labor cost savings may be gained by using the assembly 12. Further, the packing in properly loaded valves and pumps a significantly longer life than packing in valves and pumps without liveloading.

The principles, preferred embodiments and modes of operation of the present invention have been described in the foregoing specification. The invention is not to be construed as limited to the particular forms disclosed, because these are regarded as illustrious rather than restrictive. Moreover, variations and changes may be made by those skilled in the art without departing from the spirit of the invention as set forth by the following claims.

What is claimed is:

1. A method of assembling a liveload belleville washer assembly, comprising:
   stacking a plurality of belleville washers inside a stack guide;
   compressing the belleville washers a predetermined amount; and
   positioning a first removable retainer in the stack guide adjacent the compressed belleville washers to hold the belleville washers in compression, said first retainer cooperating with a second independent retainer positioned against the stack of belleville washers when the assembly is installed on a liveload assembly, whereby the first retainer is removable without releasing the compressed belleville washers.

2. The method as recited in claim 1, wherein compressing the belleville washers is accomplished by threading a nut on a stud extending coaxially through the stack guide.

3. The method as recited in claim 2, further comprising removing the nut from the stud after positioning the retainer.

4. The method as recited in claim 1, wherein compressing the belleville washers is accomplished by pushing a tube against the stack of belleville washers.

5. A method of loading a liveload belleville washer assembly, comprising:

stacking a plurality of belleville washers inside a stack guide;

operatively engaging a retainer with the stack guide;

pushing a bar which passes through the retainer against the stack of belleville washers to compress the belleville washers a predetermined amount;

fixing the retainer against the stack of compressed belleville washers; and withdrawing the bar.

* * * * *